US011205405B2

(12) United States Patent
Haas et al.

(10) Patent No.: US 11,205,405 B2

(45) Date of Patent: Dec. 21, 2021

(54) CONTENT ARRANGEMENTS ON MIRRORED DISPLAYS

(71) Applicant: Hewlett-Packard Development Company, L.P., Spring, TX (US)

(72) Inventors: Carlos Haas, Palo Alto, CA (US); Andrew Hunter, Bristol (GB); Madhu Sudan Athreya, Palo Alto, CA (US); William J. Allen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/754,216

(22) PCT Filed: Oct. 19, 2017

(86) PCT No.: PCT/US2017/057389

§ 371 (c)(1),
(2) Date: Apr. 7, 2020

(87) PCT Pub. No.: WO2019/078867

PCT Pub. Date: Apr. 25, 2019

(65) Prior Publication Data

US 2021/0193085 A1 Jun. 24, 2021

(51) Int. Cl.
*G09G 5/38* (2006.01)
*G06T 11/60* (2006.01)
(Continued)

(52) U.S. Cl.
CPC ............. *G09G 5/38* (2013.01); *G06K 9/2054* (2013.01); *G06T 11/60* (2013.01); *G09G 5/10* (2013.01);
(Continued)

(58) Field of Classification Search
None
See application file for complete search history.

(56) References Cited

U.S. PATENT DOCUMENTS 7,631,257 B2 * 12/2009 Kogan .................... G06F 16/38 715/239
8,036,416 B2 10/2011 Matsimoto et al.
(Continued)

FOREIGN PATENT DOCUMENTS

WO WO-2005031552 4/2005
WO WO-2016135183 9/2016
WO WO-2017108560 6/2017

OTHER PUBLICATIONS

Maheshwari, Piyush et al. "Smart Mirror: a Reflective Interface to Maximize Productivity" Int'l Journal of Computer Apps (0975-8887), vol. 166, No. 9 (May 2017), 6 pgs.

*Primary Examiner* — Joni Hsu
(74) *Attorney, Agent, or Firm* — Tong Rea Bentley & Kim LLC

(57) ABSTRACT

In example implementations, a method is provided. The method may be executed by a processor. The method includes receiving a reflected image of a mirrored display. At least one optimal display region is identified in the mirrored display around a main subject in the reflected image based on additional reflected subjects in the reflected image. A content is analyzed to determine an arrangement of the content in the at least one optimal display region. The content that is displayed is arranged in the at least one optimal display region.

12 Claims, 4 Drawing Sheets

HEADLINE
204
$116_1$
208
$116_2$
206

(51) Int. Cl.
*G06K 9/20* (2006.01)
*G09G 5/10* (2006.01)

(52) U.S. Cl.
CPC . *G09G 2340/04* (2013.01); *G09G 2340/0464* (2013.01); *G09G 2354/00* (2013.01)

(56) References Cited

U.S. PATENT DOCUMENTS

| | | | | |
|---|---|---|---|---|
| 10,275,790 | B1 * | 4/2019 | Krishnamoorthy .......................... | G06Q 30/0251 |
| 2008/0238889 | A1 | 10/2008 | Thorne | |
| 2009/0027552 | A1 * | 1/2009 | Yang .................. | H04N 21/4884 348/465 |
| 2011/0169782 | A1 | 7/2011 | Goertz et al. | |
| 2013/0229482 | A1 | 9/2013 | Vilcovsky et al. | |
| 2014/0085178 | A1 * | 3/2014 | Kokkosoulis ............ | A47G 1/02 345/156 |
| 2014/0119652 | A1 | 5/2014 | Das et al. | |
| 2014/0226000 | A1 | 8/2014 | Vilcovsky et al. | |
| 2015/0066666 | A1 * | 3/2015 | Nakayama ......... | G06Q 30/0277 705/14.73 |
| 2015/0262280 | A1 * | 9/2015 | Cypher ................. | G06F 3/0488 705/26.61 |
| 2016/0117763 | A1 | 4/2016 | Cypher et al. | |
| 2017/0199576 | A1 | 7/2017 | Schmitz-Le Hanne | |

* cited by examiner

CONTENT ARRANGEMENTS ON MIRRORED DISPLAYS

BACKGROUND

Displays are becoming ubiquitous and can be found in all environments today and not just living rooms or offices. Displays can be used to provide advertisements or information in a variety of different locations. For example, displays can be located in outdoor environments, in waiting areas, in bathrooms, and the like.

As display technology improves, displays can also be incorporated into a variety of different devices. For example, appliances can now be built with displays (e.g., refrigerators with a television), clothing, watches, mobile endpoint devices, and the like.

DETAILED DESCRIPTION

Examples described herein provide an apparatus and a method for arranging content on mirrored displays. As discussed above, displays are being located and/or embedded in a variety of different locations and devices. Displays can be used to provide advertisements and/or information to a user. In one example, displays can be embedded into a mirror. The mirrored display can be used at home or in retail outlets to provide advertisements, weather, news, video content, or any other type of content while a user is looking in the mirror.

Some mirrored displays may try to arrange content by simply avoiding laying content over a person's reflection in the mirror. However, other reflected images may also make it difficult to view the content that is displayed in the mirror.

Examples described herein provide a mirrored display that analyzes the reflected image to identify the person as well as other reflected images to determine how to arrange the content within the mirrored display. The appearance of the content may be modified to improve viewing of the content over different reflected images. In addition, descriptors within the content may be used to determine an optimal way to divide the content for display in different areas of the mirrored display. The way that the content is divided can be dynamically changed in real-time as the reflected image changes (e.g., the person moves, lighting in the reflected image changes, images in the background change, and the like).

Figure 1:
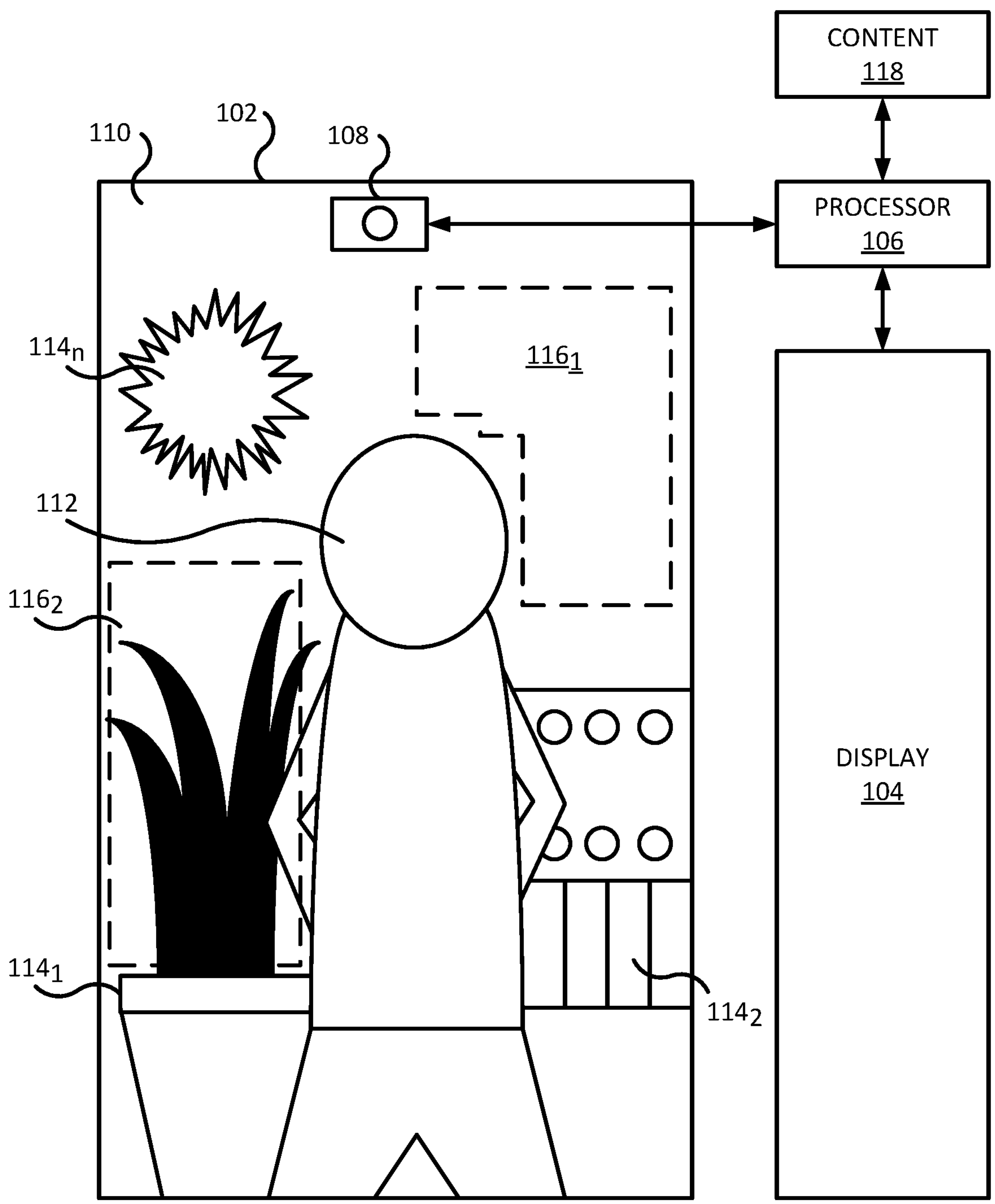
FIG. 1 is a block diagram of an example mirrored display of the present disclosure.

FIG. 1 illustrates a block diagram of a mirrored display 100. In one example, the mirrored display 100 may include a mirror 102, a display 104, a processor 106, and a camera 108. In one example, the processor 106 may be communicatively coupled to the display 104 and the camera 108. Although the processor 106 and the display 104 are illustrated as being side-by-side, it should be noted that the processor 106 and the display 104 may be part of the mirrored display 100. For example, the processor 106, the display 104 (and additional components not shown) may be located within a housing of the mirrored display 100.

In one example, the mirrored display 100 may be a monitor or display with a highly reflective screen. For example, the monitor or the display may be located below a bright light source or facing direct sunlight that causes a severe reflection on the display even though it is not a mirror. In one example, the mirrored display 100 may be a mirror in an automobile (e.g., a rear view mirror or a side view mirror).

In one example, a user, or main subject, 112 may stand in front of the mirrored display 100. The mirrored display 100 may be in a public area (e.g., a retail store, a stand in a mall, and the like) or in a private home of the user 112. The mirror 102 may reflect the image of the user 112 and other background objects (or additional reflected subjects if people) $\mathbf{114}_1$ to $\mathbf{114}_n$ (also herein referred to individually as a background object 114 or collectively as background objects 114). The background objects 114 may be any type of object or people. For example, the background object $\mathbf{114}_1$ may be a plant, the background object $\mathbf{114}_2$ may be a chair, the background object $\mathbf{114}_n$ may be a bright light, and the like.

In one example, the main subject 112 may be an object. For example, when the mirrored display 100 is deployed in a moving vehicle, the main subject 112 may be a road, or a vehicle behind the car that is in the center of the mirror rather than a driver.

In one example, the camera 108 may capture a reflected image 110. The reflected image 110 may be identical to the entire image that the user 112 would see on the mirror 102. In one example, the camera 108 may be external to the mirrored display 100. For example, the camera 108 may be located behind the main subject 112 and wirelessly transmit the reflected image 110. In other words, the reflected image 110 may be an actual image of the reflection that is seen on the mirror 102. The camera 108 may be a digital camera that takes still photographs or a video camera that captures motion video.

In one example, the camera 108 may be located inside of the mirrored display 100. The camera 108 may have a field of view that is equivalent to the dimensions of the mirror 102. Thus, the image captured by the camera 108 may be an actual image of an image that would be seen by a reflection in the mirror 102.

In one example, the camera 108 may be a stereoscopic camera, e.g., an N-array camera that can be used to perform stereoscopic matching. In one example, the camera 108 may be a passive stereoscopic camera that can be assisted by a time of flight/structured light or illuminated with active elements such as an infrared (IR) light emitting diode (LED) or laser. The reflected image 110 may be a virtualized image generated by the stereoscopic matching process. For example, the stereoscopic camera can be used to estimate the reflected image 110 seen by the main subject 112 when in front of the mirror 102. In one example, a three dimensional (3D) model of the real world in front of the mirror 102 and a two dimensional (2D) image can be created, or generated, assuming that a virtual camera positioned on the main subject 112 (e.g., using X, Y, and Z coordinates) and the mirror 102 as the viewport of the virtual camera. Using the stereoscopic camera, stereo object detection can be applied to share labels and match regions from a stereoscopic match process. Coordinates of the main subject 112 (e.g., the head and pose of the main subject 112) and objects of interest in the 3D model can be determined.

In the 3D model, the virtual camera may be positioned in the eyes of the main subject 112. Applying the concepts of viewport and view frustum, the viewport may assume the position and dimensions of the mirror 102. With the positon and dimensions of the mirror 102, the 2D image with an estimated projection on the mirror 102 may be the projection of the 3D model frustum in the viewport.

The reflected image 110 may be transmitted to the processor 106. The processor 106 may analyze the reflected image 110 to identify at least one optimal display region $\mathbf{116}_1$ and $\mathbf{116}_2$ (also referred to herein individually as an optimal display region 116 or collectively as optimal display regions 116). The optimal display regions 116 may be used to arrange different portions of content 118 into respective optimal display regions 116.

In one example, the content 118 may be obtained by the processor 106 from a local storage memory (e.g., a hard disk drive (not shown) of the mirrored display 100, a random access memory (RAM) of the mirrored display 100, and the like), an external storage device (e.g., the mirrored display 100 may have a universal serial bus (USB) interface), a remote server (e.g., via the Internet), and the like. The content 118 may be any type of content that can be displayed by the display 104.

In one example, the content 118 may be customized for the user 112. For example, the content 118 may be news content, score updates, traffic updates, and the like that the user 112 selects to have displayed. In another example, the user 112 may log into the mirrored display and the content 118 may be advertisements directed towards the user 112 based on a shopping history at a retailer.

The display 104 may be approximately the same size as the mirror 102. As a result, the display 104 may be capable of generating an image at any location of the mirror 102. The display 104 may be capable of adding backlight to allow the image to be seen through the reflected image 110 on the mirror 102.

Figure 2:
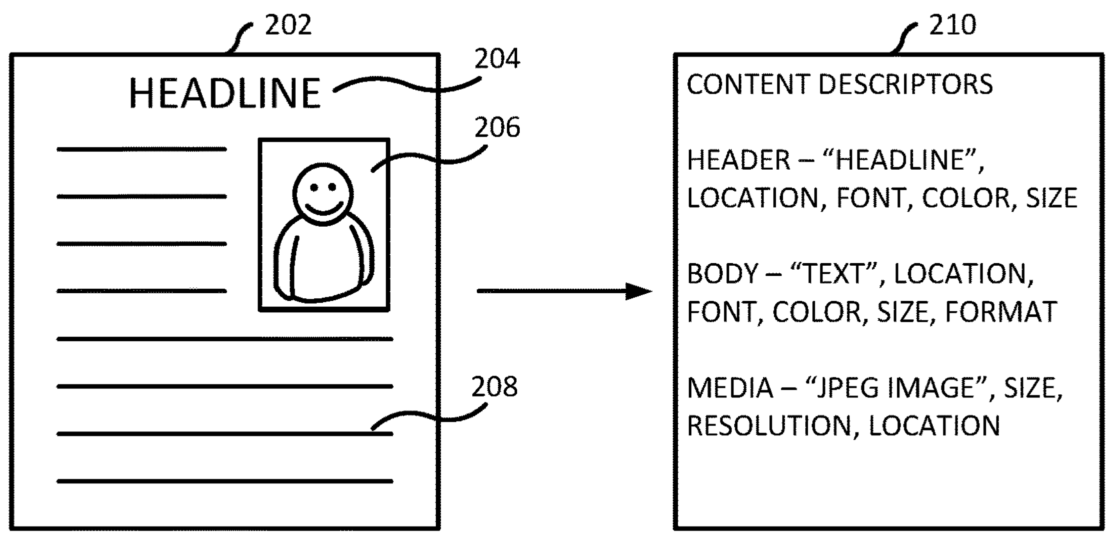
FIG. 2 is a block diagram of example content of the present disclosure.

In one example, the content 118 may be any type of content, such as an advertisement, a web page, a digital newspaper page, a digital magazine page, digital multimedia, and the like. FIG. 2 illustrates an example of the content 118. In one example, the content 118 may be a web page 202. The webpage 202 may have different sections or portions such as a header 204, an image 206, and a body of text 208. It should be noted that the different sections are provided as examples.

Digital content such as the webpage 202 may be written in code 210 (e.g., a hypertext markup language). The code 210 provides a very simple example of descriptors used to describe each section for display. The content descriptors may contain a description of each section (e.g., the header 204, the image 206, and the body of text 208), parameters for each section, and the like. For example, the parameters included in the descriptor for the header 204 may include the text in the header 204 (e.g., "headline"), a location (e.g., top of page), a font, a color of the text, a size, and the like. Other parameters for different descriptors of different portions of the webpage 202 may include a format (e.g., bold, italicize, columns, left justified, centered, and the like), a size, a resolution, and the like.

The code 210 may be used by the processor 106 to identify the different portions of the content 118 that could be easily divided and displayed in the at least one optimal display region 116. The parameters for each portion that define an appearance of the respective portion may then be adjusted. In one example, the code 210 may be modified by the processor 106 with the adjustments to display the portion in a respective optimal display region 116. For example, the size may be changed from 12 point font to 6 point font, the location may be moved from a middle right to a middle left, the color may be changed from black to white, and the like.

In one example, the optimal display regions 116 may be defined as any areas in the reflected image that are located around the user 112. Although two optimal display regions 116 are illustrated in FIG. 1, it should be noted that any number of optimal display regions may be identified.

In one example, the optimal display region $\mathbf{116}_1$ may be located around the user 112. In one example, the optimal display regions 116 may be defined as regions around the user 112 in addition to having no background objects 114 in the regions. For example, a plain wall may be located behind the user 112 and no background objects 114 may be in the optimal display region $\mathbf{116}_1$.

In another example, the optimal display regions 116 may be defined as any regions around the user 112 that have a brightness level below a predefined threshold (e.g., brightness level below 50 on a scale of 1 to 100), or below a particular color value for each pixel based on a pixel level analysis. For example, the background object $\mathbf{114}_n$ may be a spotlight that generates a large amount of light and brightness. The display 104 may be able to provide additional brightness, but may not be able to make images darker. As a result, any content 118 displayed over the background object $\mathbf{114}_n$ may not be visible.

In another example, the optimal display regions 116 may be defined as any regions around the user 112 that have a dark color (e.g., a pixel color value less than 125 where a value of 0 is black and a value of 255 is white in a red, green, blue (RGB) colorspace). For example, the optimal display region $\mathbf{116}_2$ may be located over a background object $\mathbf{114}_1$ that may be a dark plant. The display 104 may adjust the content 118 to increase the brightness of the content 118 to allow the content 118 to be visible over the background object $\mathbf{114}_1$.

In another example, the optimal display regions 116 may be defined as regions that may include a portion of the user 112, but do not obscure a particular body part of the user 112. For example, mirrored display 100 may be in a dressing room and the optimal display region $\mathbf{116}_2$ may include a portion of the arm of the user 112, but should not overlap a body of the user 112 so that the user 112 can view the clothes he or she is trying on. In another example, the optimal display region $\mathbf{116}_1$ may obscure a portion of the hair of the user 112, but should not obscure the eyes of the user 112. For example, a heading content may be located at a top of the optimal display region $\mathbf{116}_1$ and cover a portion of the hair of the user 112.

In another example, the optimal display regions 116 may be based on regions that do not include motion. For example, areas in the reflected image 110 where people are moving may not provide a good viewing area for the content 118. The constant changing of the background color and/or contrast due to moving people may negatively affect the display of the content 118.

In another example, the optimal display regions 116 may be based on a user preference. For example, the user 112 may specify that he or she prefers to have the optimal display region 116 located around her eye level, or over any region below her neck even if the optimal display region 116 obscures the torso.

Figure 3:
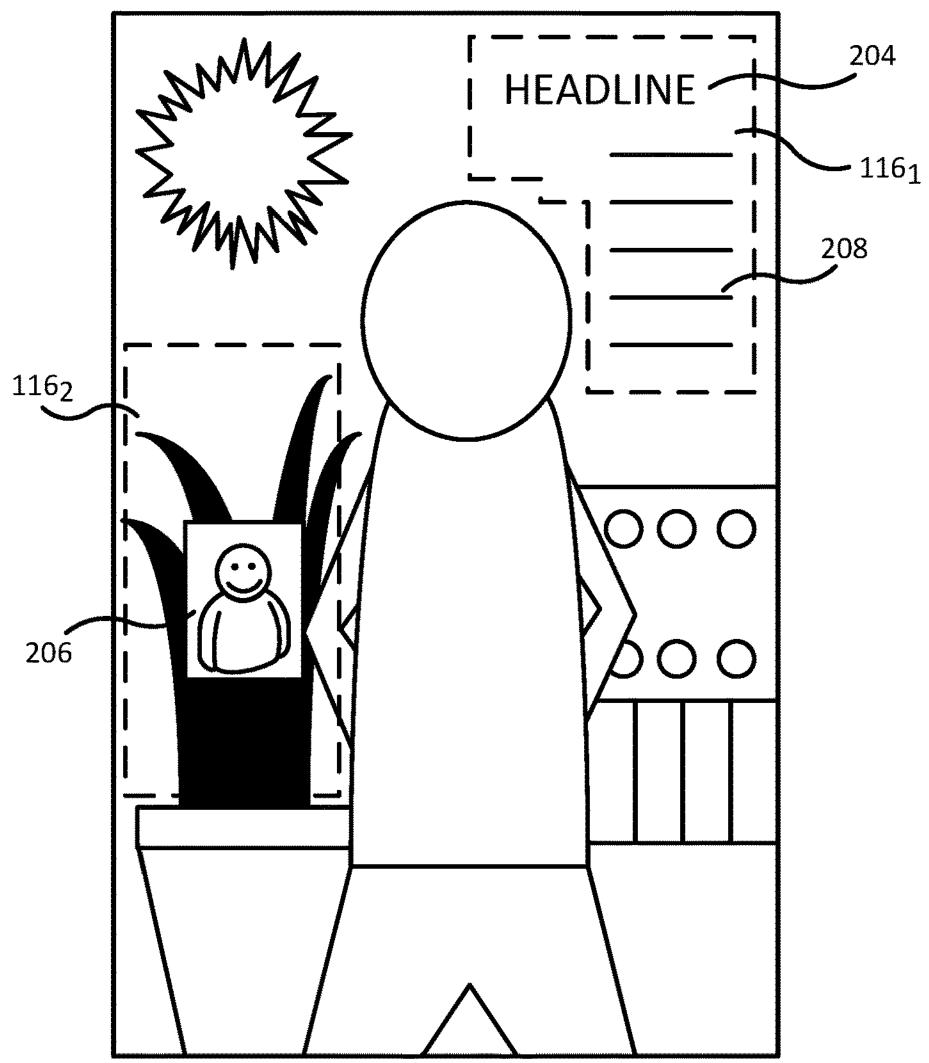
FIG. 3 is a block diagram of an example arrangement of content in optimal display areas on the mirrored display of the present disclosure.

In one example, after the processor 106 determines how the content 118 can be divided and identifies the optimal display regions 116, the processor 106 may determine an arrangement of the content. The content may then be displayed by the display 104 on the mirror 102 in accordance with the arrangement, as illustrated in FIG. 3.

The arrangement of the content 118 may be based on parameters of the optimal display region 116 (e.g., a location of the optimal display region 116, a size of the optimal display region 116, a shape of the optimal display region 116, a background color of the optimal display region 116, and the like) and the descriptors of the content 118 (e.g., a type of content, a location, a size, a color, a format, and the like).

For example, the header 204 may be located at a top of a page and have a large font. The optimal display region $\mathbf{116}_1$ may have the largest width and be located near the top of the mirror 102. Thus, the header 204 may be displayed in the optimal display region $\mathbf{116}_1$, as illustrated in FIG. 3. The formatting and the amount of the body of text 208 may also fit in the optimal display region $\mathbf{116}_1$, as shown in FIG. 3.

In one example, content 118 may be arranged in the optimal display region 116 based on a difference in contrast of color pixels in the content 118 and the pixels in the optimal display region 116. For example, the image 206 may have an average value of color pixels that are relatively light (e.g., greater than 125 for each color channel in an RGB color space). The optimal display region $\mathbf{116}_2$ may have a relatively dark color value (e.g., less than 125 for each color channel in an RGB color space) and the optimal display region $\mathbf{116}_1$ may have a white background (e.g., approximately 255 color value for each color channel in an RGB color space). The processor 106 may compute the color difference between the color values of the image 206 and the optimal display regions $\mathbf{116}_1$ and $\mathbf{116}_2$. The processor 106 may determine that the optimal display region $\mathbf{116}_2$ has the greatest difference in color contrast (e.g., difference in color values) with the image 206 and display the image 206 in the optimal display region $\mathbf{116}_2$, as shown in FIG. 3.

In one example, the processor 106 may modify the parameters of the descriptors for the portions of the content 118. For example, the processor 106 may modify a text color to improve a contrast of the text in an optimal display region 116. The processor 106 may resize text or the image to fit within the optimal display region 116. In another example, the processor 106 may change the parameters of the descriptors based on a user preference. For example, the user 112 may prefer reading text in an Arial 10 point font. As a result, the processor 106 may modify any text into Arial 10 point font when displayed in an optimal display region 116.

In one example, the different portions of the content 118 may be displayed overtime in the optimal display regions 116. For example, the content 118 may be multiple pages long or all of the content 118 may not fit into the available space in the optimal display regions 116. Some of the content 118 may be animated in the optimal display regions 116. For example, text may scroll within the optimal display regions or be automatically changed over time (e.g., a display a first section of text for five seconds, display a second section of the text for five seconds, display a third section of the text for five seconds, and the like).

In one example, the content 118 in the optimal display regions 116 may be changed based on detecting where the eyes of the user 112 are focused. For example, the camera 108 may track the movement, or a position, of the eyes of the user 112 as the user may start reading content 118 in the optimal display region $\mathbf{116}_1$. When the user 112 is done, the user may then begin reading the content 118 in the optimal display region $\mathbf{116}_2$. The camera 108 may detect the movement of the eyes off of the optimal display region $\mathbf{116}_1$. In response, the content 118 that is displayed in the optimal display region $\mathbf{116}_1$ can be changed to the next available content 118 that is arranged to be located in the optimal display region $\mathbf{116}_1$.

In one example, the processor 106 may receive updated reflected images 110 periodically. For example, every thirty seconds, every minute, every five minutes, and the like, a new reflected image 110 may be received by the processor 106. In another example, the multiple new reflected images 110 may be received within a second. As a result, it may appear that the optimal display regions 116 are based on a continuous tracking of the user 112. The processor 106 may then analyze the updated reflected images 110 to identify the optimal display regions 116 as the background objects 114 move or change over time. For example, the size and location of the optimal display regions 116 may change as the background objects 114 move or change overtime. The processor 106 may then re-arrange the content 118 based on changes to the optimal display regions 116.

The mirrored display 100 of the present disclosure analyzes the reflected image 110 for more than just the user 112. For example, the mirrored display 100 may detect and consider background objects 114 when determining the best size and locations for the optimal display regions 116. The process may be repeated continuously as the processor 106 receives updated reflected images 110, identifies new optimal display regions 116 and determines new content arrangements in response to the new optimal display regions 116.

Figure 4:
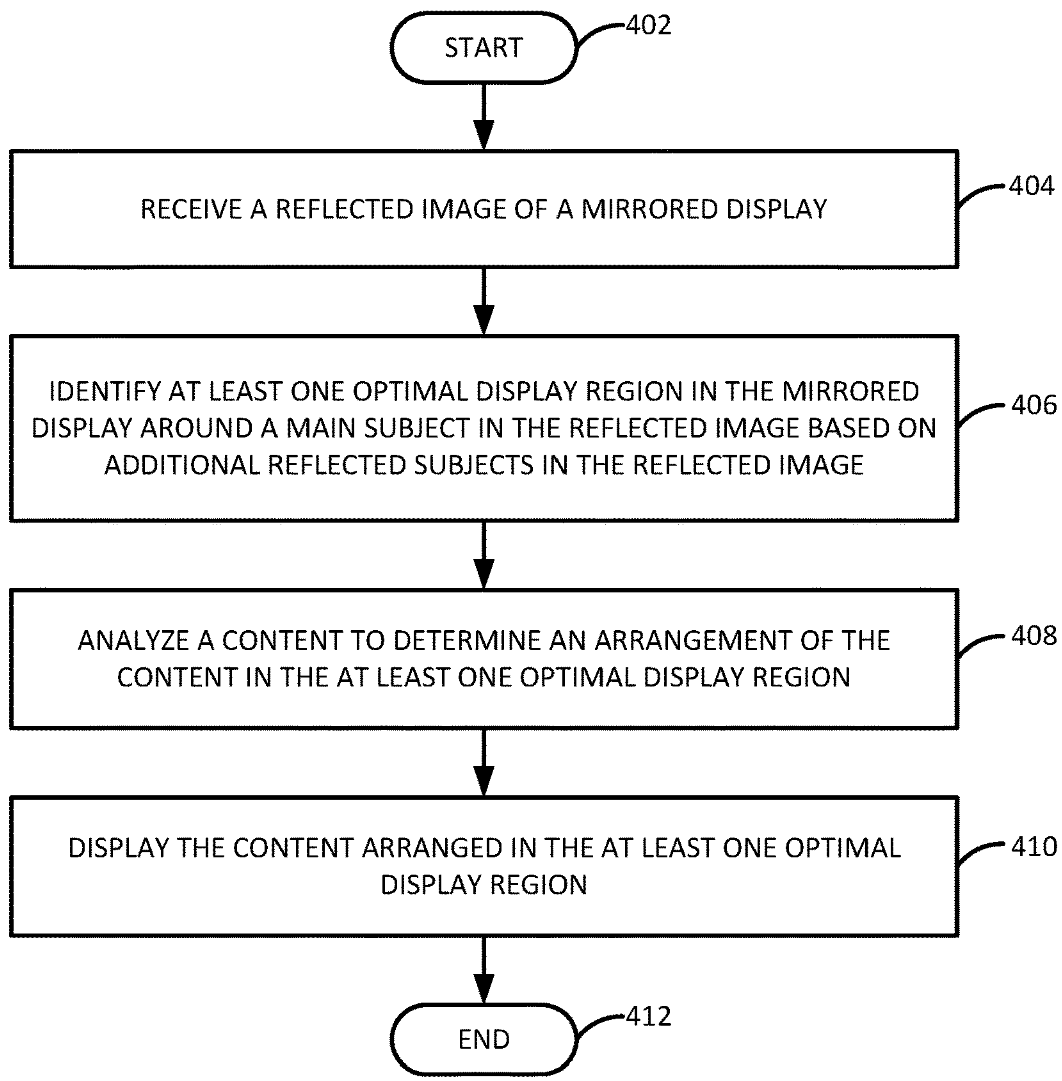
FIG. 4 is a flow chart of an example method for arranging content in a mirrored display.

FIG. 4 illustrates a flow diagram of an example method 400 for arranging content on a mirrored display. In one example, the method 400 may be performed by the mirrored display 100.

At block 402, the method 400 begins. At block 404, the method 400 receives a reflected image of a mirrored display. The reflected image may be an actual image that is captured or a virtualized image generated based on processing of images captured by a camera. For example, a camera in the mirrored display, or external to the mirrored display, may capture an actual image of what would be equivalent to the image reflected by a mirror of the mirrored display. In other words, the field of view of the camera may be equivalent to the size of the mirror. In another example, a stereoscopic camera may be used to generate a 2D images that estimates the image seen on the mirror based on a comparison of images captured by the stereoscopic camera and a 3D model rendered based off of the images captured by the stereoscopic camera. The reflected image may then be transmitted to the processor.

At block 406, the method 400 identifies at least one optimal display region in the mirrored display around a main subject in the reflected image based on additional reflected subjects in the reflected image. In one example, the additional reflected subjects may be people or objects that are located behind the main subject in the reflected image. It may be assumed that the person closest to the mirror is the main subject and all other objects and subjects are the additional reflected subjects. Examples of how the optimal display region may be identified are described above.

At block 408, the method 400 analyzes a content to determine an arrangement of the content in the at least one optimal display region. In one example, the content may be written in a code form. The code form may include descriptors for each portion of content that is to be displayed in the mirrored display. The descriptors may provide a description of various parameters associated with each content. The descriptors may help identify different portions that can be divided into different arrangements by the processor.

In one example, the arrangement of the content may be determined based on the descriptors of each portion of the content and parameters associated with the at least one optimal display region. For example, a size and a location of a portion of the content may fit in an optimal display region located near a top of the mirrored display. A light colored image or other content may fit in an optimal display region having a dark colored background.

In one example, the parameters of the portions of the content can be modified to improve visibility within the optimal display region. For example, text may be enlarged for easier viewing, the color of text can be changed to improve contrast with the background in the optimal display region, a size of an image may be reduced to fit in the optimal display region, and the like.

At block 410, the method 400 displays the content arranged in the at least one optimal display region. For example, a display may generate the content for display in an arrangement determined by the processor. The content may appear in the respective optimal display region in the mirrored display so that a user may see his or her own reflection and the content that is displayed.

In one example, blocks 404, 406, 408, and 410 may be repeated periodically. For example, a new reflected image may be captured and received by the processor every few seconds, every minute, every 15 minutes, and the like. The background objects or additional subjects may change over a period of time as people move, new objects enter the reflection, and the like. As a result, new optimal display regions may be identified, a new content arrangement may be determined, and the new content arrangement may be displayed in the new optimal display regions. The process may be repeated until a main subject is no longer detected (e.g., no user is within a predefined distance to the mirrored display, the camera does not detect a user looking at the mirror, and the like), or the mirrored display is powered down. At block 410, the method 400 ends.

Figure 5:
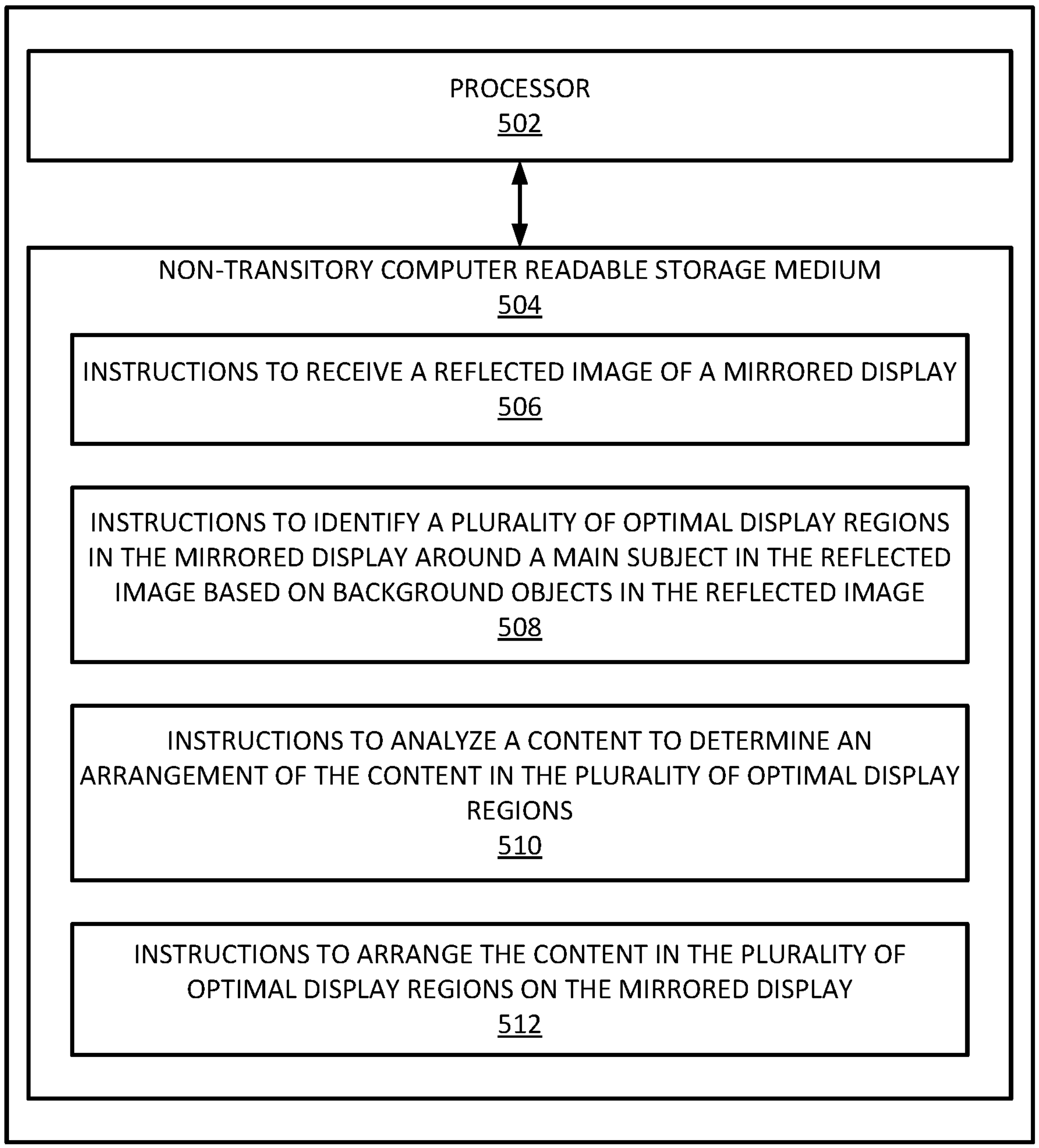
FIG. 5 is a block diagram of an example non-transitory computer readable storage medium storing instructions executed by a processor.

FIG. 5 illustrates an example of an apparatus 500. In one example, the apparatus 500 may be the mirrored display 100. In one example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In one example, the instructions 506 may include instructions to receive a reflected image of a mirrored display. The instructions 508 may include instructions to identify a plurality of optimal display regions in the mirrored display around a main subject in the reflected image based on background objects in the reflected image. The instructions 510 may include instructions to analyze a content to determine an arrangement of the content in the plurality of optimal display regions. The instructions 512 may include instructions to arrange the content in the plurality of optimal display regions on the mirrored display.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

We claim:

1. A method, comprising:

receiving, by a processor, a reflected image of a mirrored display;

identifying, by the processor, a display region in the mirrored display around a main subject in the reflected image based on additional reflected subjects in the reflected image; and analyzing, by the processor, a content to determine an arrangement of the content in the display region, wherein the analyzing comprises analyzing a descriptor associated with each portion of the content; and displaying, by the processor, the content arranged in the display region based on the descriptor associated with each portion of the content and parameters associated with the display region.

2. The method of claim 1, wherein the reflected image comprises a virtualized image generated by a stereoscopic matching process.

3. The method of claim 1, comprising:

adjusting, by the processor, an appearance of the content in the display region based on the additional reflected subjects.

4. The method of claim 3, wherein the adjusting comprises at least one of: changing a color of the content, changing a size of the content, or changing a brightness of the content.

5. The method of claim 1, wherein the display region is identified based on a user preference.

6. The method of claim 1, wherein the descriptor associated with each portion of the content identifies different types of content within the content.

7. A non-transitory computer readable storage medium encoded with instructions executable by a processor, the non-transitory computer-readable storage medium comprising:

instructions to receive a reflected image of a mirrored display;

instructions to identify a plurality of display regions in the mirrored display around a main subject in the reflected image based on background objects in the reflected image;

instructions to analyze a content to determine an arrangement of the content in the plurality of display regions, wherein the instructions to analyze comprises instructions to analyze a descriptor associated with each portion of the content; and instructions to arrange the content in the plurality of display regions on the mirrored display based on the descriptor associated with each portion of the content and parameters associated with the plurality of display regions.

8. The non-transitory computer readable storage medium of claim 7, wherein the instructions to identify comprise:

instructions to repeat the instructions to receive, the instructions to identify, and the instructions to arrange periodically.

9. The non-transitory computer readable storage medium of claim 7, comprising:

instructions to adjust an appearance of the content in the plurality of display regions based on the background objects.

10. The non-transitory computer readable storage medium of claim 9, wherein the instructions to adjust comprise at least one of: changing a color of the content, changing a size of the content, or changing a brightness of the content.

11. The non-transitory computer readable storage medium of claim 7, wherein the descriptor associated with each portion of the content identifies different types of content within the content.

12. An apparatus, comprising:

a mirror;

a display embedded in the mirror to display content in accordance with a content arrangement in a display region;

a camera to capture a reflected image of the mirror;

a processor communicatively coupled to the display and the camera, the processor to receive the reflected image, to identify the display region in the mirrored display around a main subject in the reflected image based on additional reflected subjects in the reflected image, and to analyze the content to determine the content arrangement in the display region, wherein the content is analyzed based on a descriptor associated with each portion of the content and the content is arranged in the display region based on the descriptor associated with each portion of the content and parameters associated with the display region.

* * * * *